US007366915B2

(12) United States Patent
Narin et al.

(10) Patent No.: US 7,366,915 B2
(45) Date of Patent: Apr. 29, 2008

(54) DIGITAL LICENSE WITH REFERRAL INFORMATION

(75) Inventors: Attila Narin, Bothell, WA (US); Peter David Waxman, Bellevue, WA (US); Christopher Robert Richard Madonna, Seattle, WA (US); Marco A. DeMello, Redmond, WA (US); Chandramouli Venkatesh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 10/135,303

(22) Filed: Apr. 30, 2002

(65) Prior Publication Data

US 2003/0204723 A1 Oct. 30, 2003

(51) Int. Cl.
G06F 11/30 (2006.01)
G06F 12/14 (2006.01)
H04L 9/32 (2006.01)

(52) U.S. Cl. .................... 713/193; 380/277; 380/278; 380/279; 380/283; 380/286

(58) Field of Classification Search ............ 713/193; 380/277–286
See application file for complete search history.

(56) References Cited

U.S. PATENT DOCUMENTS

| 5,592,552 | A | * | 1/1997 | Fiat ........................ 713/163 |
| 5,699,431 | A | * | 12/1997 | Van Oorschot et al. ....... 380/30 |
| 5,715,403 | A | | 2/1998 | Stefik .......................... 705/44 |
| 6,920,567 | B1 | * | 7/2005 | Doherty et al. ............... 726/22 |
| 2003/0078853 | A1 | * | 4/2003 | Peinado et al. ............... 705/26 |
| 2004/0003270 | A1 | * | 1/2004 | Bourne et al. ............... 713/193 |
| 2004/0003383 | A1 | * | 1/2004 | Chenier ....................... 717/154 |
| 2004/0039924 | A1 | * | 2/2004 | Baldwin et al. ............. 713/189 |
| 2004/0168073 | A1 | * | 8/2004 | Bourne et al. ............... 713/193 |
| 2004/0215959 | A1 | * | 10/2004 | Cook et al. .................. 713/156 |
| 2005/0102240 | A1 | * | 5/2005 | Misra et al. .................... 705/59 |

FOREIGN PATENT DOCUMENTS

WO WO 00/58811 10/2000

(Continued)

OTHER PUBLICATIONS

Cox, B. "Superdistibution and the Economics of Bits",*IEEE*, 1997, 14(1), 22-24.

(Continued)

*Primary Examiner*—Nasser Moazzami
*Assistant Examiner*—Chinwendu C Okoronkwo
(74) *Attorney, Agent, or Firm*—Woodcock Washburn LLP

(57) ABSTRACT

A digital license corresponds to encrypted digital content and includes a content key for decrypting same. The content key is encrypted and is decryptable by a decryption key available only to the first persona, the license thereby being tied to the first persona. The license is a first license and further includes referral information specifying a first location at which a second persona may obtain a second license for the content tied thereto. The second persona requests to render the content by way of the first license and the request is denied because the first license is not tied to the second persona. The referral information is obtained from the first license and employed to initiate contact with the specified first location and obtain the second license tied to the second persona.

8 Claims, 3 Drawing Sheets

FOREIGN PATENT DOCUMENTS

| | | |
|---|---|---|
| WO | WO 00/59150 | 10/2000 |
| WO | WO 01/52021 | 7/2001 |

OTHER PUBLICATIONS

Griswold, G.N., "A Method for Protecting Copyright on Networks", *IMA Intellectual Property Project Proceedings*, 1994, 1(1), 169-178.

Kahn, R.E., "Deposit, Registration, and Recordation in an Electronic Copyright Management System", *IMA Intellectual Property Project Proceedings*, 1994, 1(1), 111-120.

Mori, R. et al., "Superdistribution: The Concept and the Architecture", *Transactions of the Institute of Electronics, Information and Communication Engineers E*, 1990, E73(7), 1133-1146.

\* cited by examiner

DIGITAL LICENSE WITH REFERRAL INFORMATION

TECHNICAL FIELD

The present invention relates to a digital license for allowing rendering of digital content by a computer application or the like on a computing device or the like. More particularly, the present invention relates to such a digital license with referral information where the digital license is tied to a first computing device or persona and not a second computing device or persona, where the digital license if resident on the second computing device employs the referral information in response to an attempt to render the digital content on such second computing device, and where the employed referral information points to a licensing site that can provide for the digital content a digital license tied to the second computing device.

BACKGROUND OF THE INVENTION

The distribution of digital content such as electronic books, audio, video, etc. is increasingly taking place over the Internet and other distribution channels. Digital content when acquired is typically accompanied by a digital license with license terms that grant a user the right to access and render the digital content. In one scenario, the digital content and digital license are included together in a single file or the like, while in another scenario the digital content and digital license are in separate files or the like.

In either scenario, and as may be appreciated, such license terms may grant broad rights to render the content, such as for example an unlimited number of times in perpetuity, or may grant narrow rights to render the content, such as for example a fixed number of times during a fixed period of time. The license itself may be tied to the user and may allow rendering on any computing device of the user capable of such rendering, or may be tied to a specific computing device or persona and thus allow rendering only on such computing device or persona.

One example of an architecture for providing digital rights management based on a digital license is set forth in U.S. patent application Ser. No. 09/290,363, filed Apr. 12, 1999 and entitled "ENFORCEMENT ARCHITECTURE AND METHOD FOR DIGITAL RIGHTS MANAGEMENT", and U.S. Provisional Application No. 60/126,614, filed Mar. 27, 1999 and entitled "ENFORCEMENT ARCHITECTURE AND METHOD FOR DIGITAL RIGHTS MANAGEMENT", each of which is hereby incorporated by reference in its entirety. Another example of such an architecture is set forth in U.S. patent application Ser. No. 09/604,564, filed Jun. 27, 2000 and entitled "SYSTEM AND METHOD FOR ACTIVATING A RENDERING DEVICE IN A MULTI-LEVEL RIGHTS-MANAGEMENT ARCHITECTURE", U.S. patent application Ser. No. 09/604,540, filed Jun. 27, 2000 and entitled "SERVER FOR AN ELECTRONIC DISTRIBUTION SYSTEM AND METHOD OF OPERATING", and U.S. patent application Ser. No. 09/604,543, filed Jun. 27, 2000 and entitled "INDIVIDUALIZED SECURE REPOSITORY AND SYSTEM AND METHOD FOR PROVIDING SAME", each of which is also hereby incorporated by reference in its entirety.

In the aforementioned situation where the license is tied to the user, the license is typically not transferable to another user. Correspondingly, in the aforementioned situation where the license is tied to the user's computing device, the license is typically not transferable to another computing device. That is to say, and with regard to either situation, the digital license and the corresponding digital content may be physically transferable, but because of the tying, the digital license will refuse to allow rendering at the transferred-to location. Put simply, according to the tied digital license and/or the terms therein, the transferred-to location does not have the right to render the corresponding digital content anywhere other than the tied-to location and therefore is prevented from doing so.

In the situation where the tied digital license does not provide the right to render the corresponding digital content at transferred-to location, be it another user or another computing device, it has heretofore been the situation in at least some instances that the user at the transferred-to location is informed of the lack of the right to render, and the attempt to render is then terminated without more. To say the least, such an experience is frustrating to the user. More importantly, an opportunity to provide (i.e., sell) an appropriate digital license to the user at the location is missed.

Accordingly, a need exists for a method and mechanism for providing referral information in the digital license. More particularly, a need exists for such referral information that is employed after a failed attempt to render at a transferred-to location or other failed attempts to render, and refers a user to a site where the user can obtain an appropriate license.

SUMMARY OF THE INVENTION

The aforementioned need is satisfied by the present invention in which a digital license corresponds to a piece of encrypted digital content and includes a content key for decrypting the encrypted content. The content key is encrypted and the license is tied to a first persona by way of the encrypted content key being decryptable by a decryption key available only to the first persona. The license is a first license and further includes referral information specifying a first location at which a second persona may obtain a second license for the content tied thereto.

For the second persona to obtain the second license tied thereto, such second persona requests to render the content by way of the first license and receives notification that the request is denied based on the first license not being tied to the second persona. The referral information is then obtained from the first license and employed to initiate contact with the specified first location. A transaction is performed at the specified first location to obtain the second license tied to the second persona, and the second license is prepared and delivered in response thereto.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
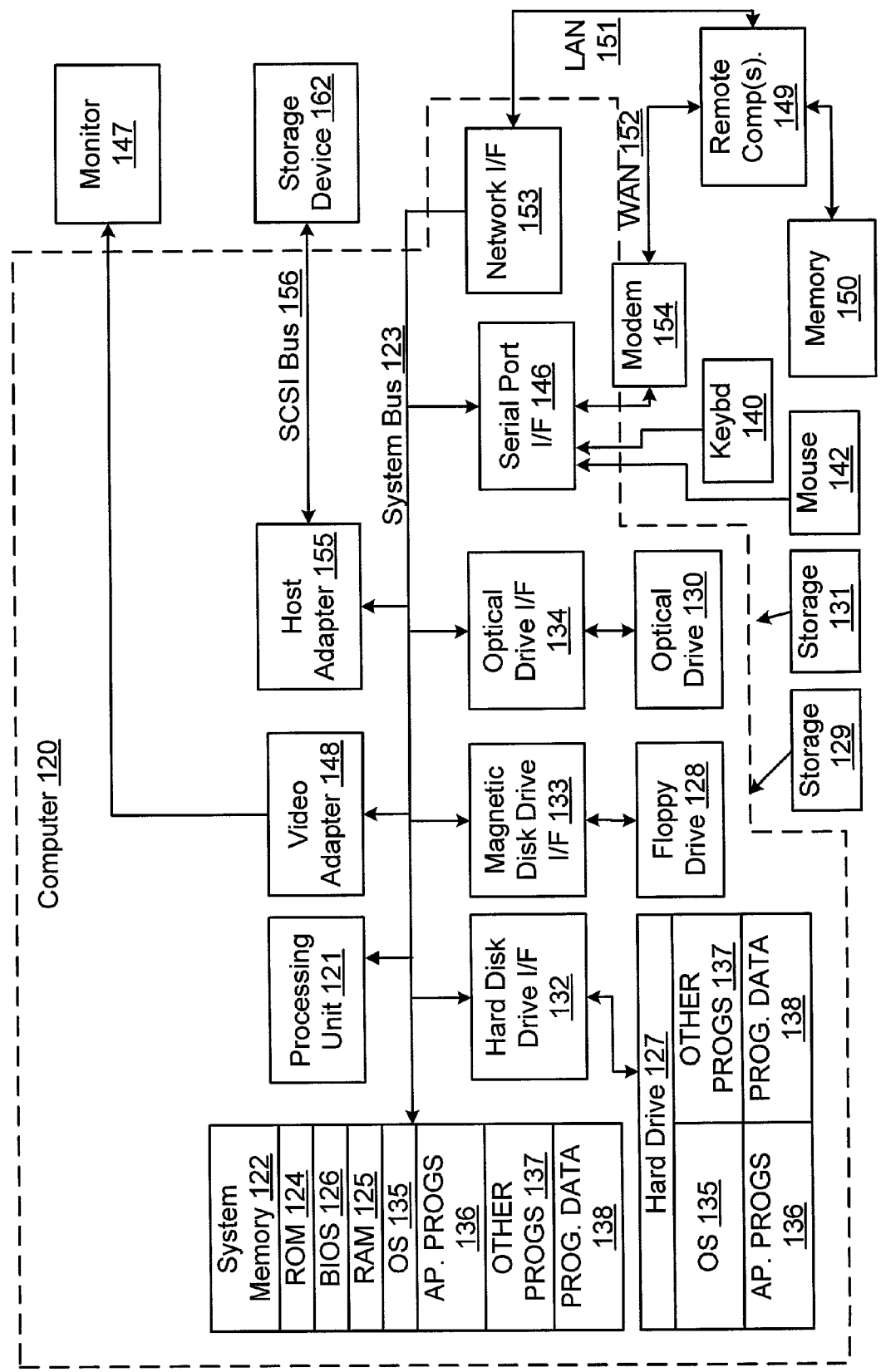
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Referring now to FIG. 1 it is seen that a piece of digital content 10 such as an electronic book, an audio presentation, a video presentation, a multimedia presentation, etc. is distributed from a source 12 to a computing device 14 of a user. Note that the computing device 14 may be any computing implement without departing from the spirit and scope of the present invention, and may for example include a personal computer, a portable device with memory and computing capabilities, a computer-readable medium such as a computer disk, etc. Typically, the user acquires the content 10 from a retailer or other distributor, perhaps for an exchange of value (i.e., a payment), and the retailer/distributor controls or otherwise directs the source 12 to distribute the content 10 to the user at the computing device 14.

In one embodiment, the source 12 is a server and the distribution takes place over a network such as the Internet or the like. However, it is to be appreciated that any appropriate form of source 12 and distribution therefrom may be employed without departing from the spirit and scope of the present invention.

Typically, the content 10 is encrypted, and the decryption key is provided in a digital license 16 that the user must also obtain. Note that the license 16 may be obtained essentially at the same time as the content 10 or at another time from the source 12 or from another source, and the license 16 may be integral with (e.g., in the same file, as shown) or distinct from (e.g., in separate files) the content 10, all without departing from the spirit and scope of the present invention. As may be appreciated, the license 16 for the content 10 generally grants the user the right to access and render the digital content, and may include specific license terms that set forth the particular access rights (e.g., a play count, a start time, an expiration time, etc.) and rendering rights (e.g., the content may be played but not copied, etc.).

Again, one architecture for providing digital rights management based on a digital license 16 for digital content 10 is set forth in U.S. patent application Ser. No. 09/290,363, filed Apr. 12, 1999 and entitled "ENFORCEMENT ARCHITECTURE AND METHOD FOR DIGITAL RIGHTS MANAGEMENT", and U.S. Provisional Application No. 60/126,614, filed Mar. 27, 1999 and entitled "ENFORCEMENT ARCHITECTURE AND METHOD FOR DIGITAL RIGHTS MANAGEMENT"; and another architecture is set forth in U.S. patent application Ser. No. 09/604,564, filed Jun. 27, 2000 and entitled "SYSTEM AND METHOD FOR ACTIVATING A RENDERING DEVICE IN A MULTI-LEVEL RIGHTS-MANAGEMENT ARCHITECTURE", U.S. patent application Ser. No. 09/604,540, filed Jun. 27, 2000 and entitled "SERVER FOR AN ELECTRONIC DISTRIBUTION SYSTEM AND METHOD OF OPERATING", and U.S. patent application Ser. No. 09/604,543, filed Jun. 27, 2000 and entitled "INDIVIDUALIZED SECURE REPOSITORY AND SYSTEM AND METHOD FOR PROVIDING SAME", each of which is again hereby incorporated by reference in its entirety.

Importantly, in any architecture, a license 16 issued for and corresponding to content 10 is sealed to or tied to a particular user or computing device 14. If tied to a user, it may be the case that the user can render the content 10 by way of the license 16 on any of several computing device 14 of the user. Tying to a user is typically accomplished by including in the license 16 information that identifies the user/computing device 14/persona, and by requiring that the license 16 and/or a rendering system on a computing device 14 not allow rendering to take place based on the license 16 unless the identifying information in the license 16 matches the user attempting rendering. Thus, a license 16 issued for and tied to a first user can only be employed to render the corresponding content 10 by such first user. If an attempt is made to employ such license 14 by a second user, the attempt should fail based on the license 16 not being tied to the second user.

Correspondingly, if tied to a computing device 14, the user can render the content 10 by way of the license 16 on such computing device 14 only. Tying to a computing device 14 is typically accomplished by including in the license 16 information that identifies the computing device 14, and by requiring that the license 16 and/or a rendering system on a computing device 14 not allow rendering to take place based on the license 16 unless the identifying information in the license 16 matches the computing device 14 upon which rendering is to take place. Thus, a license 16 issued for and tied to a first computing device 14 can only be employed to render the corresponding content 10 on such first computing device 14. If an attempt is made to employ such license 14 by a second computing device 14, the attempt should fail based on the license 16 not being tied to the second computing device 14.

Typically, a license 16 is tied to a user or computing device 14 by including therein a content key for the corresponding content 10, where the content key is encrypted according to a key that should be known to the user or computing device 14. Note, though, that other items in the license 16 are not necessarily likewise encrypted. In fact, encrypting other items, such as for example the referral information disclosed below, would unnecessarily prevent another user or computing device 14 from accessing such other items.

In one embodiment of the present invention, the content 10 is encrypted according to a cryptographic content key (CK), and is decryptable based on a decryption key stored in the corresponding license 16. Thus, such content 10 is tied to such license 16. The content 10 and license 16 may also be tied by having the content 10 include the license 16 therein. Typically, (CK) is a symmetric key and is therefore the decryption key, although other cryptographic arrangements and tying arrangements may be employed. Also typically, (CK) is stored in the license 16 encrypted according to a key available to the user or the computing device 14. In this manner, the license 16 is tied to such user or computing device 14, as the case may be, and the content 10 is by extension tied to same. For example, the user or the computing device 14 may be the owner of a public key-private key pair (PU-XX, PR-XX), and (CK) is encrypted according to (PU-XX) (i.e., (PU-XX(CK))) and thus decryptable according to (PR-XX), although other cryptographic arrangements and tying arrangements may again be employed.

Briefly, then, upon mounting the content 10 with the license 16 to a computing device 14 of a tied-to user or to a tied-to computing device 14, as the case may be, and upon receiving a request to render the content 10, the license 16 is examined to determine if such request is to be granted. In particular, it is determined among other things whether the license 16 is in fact tied to the requesting user or requesting computing device 14, and whether the license 16 has terms therein that allow or at least do not prevent such rendering. Assuming such rendering request is in fact granted, (PU-XX(CK)) is obtained from the license 16, and (PR) is obtained and applied to (PU-XX(CK)) to produce (CK). (CK) is then applied to decrypt the content 10, and same is rendered. Notably, determining whether the request is to be granted may in fact comprise checking to see whether the license 16 is in fact tied to the user or computing device 14 (i.e., whether the obtained (PR) decrypts (PU-XX(CK)) to produce (CK)).

Figure 3:
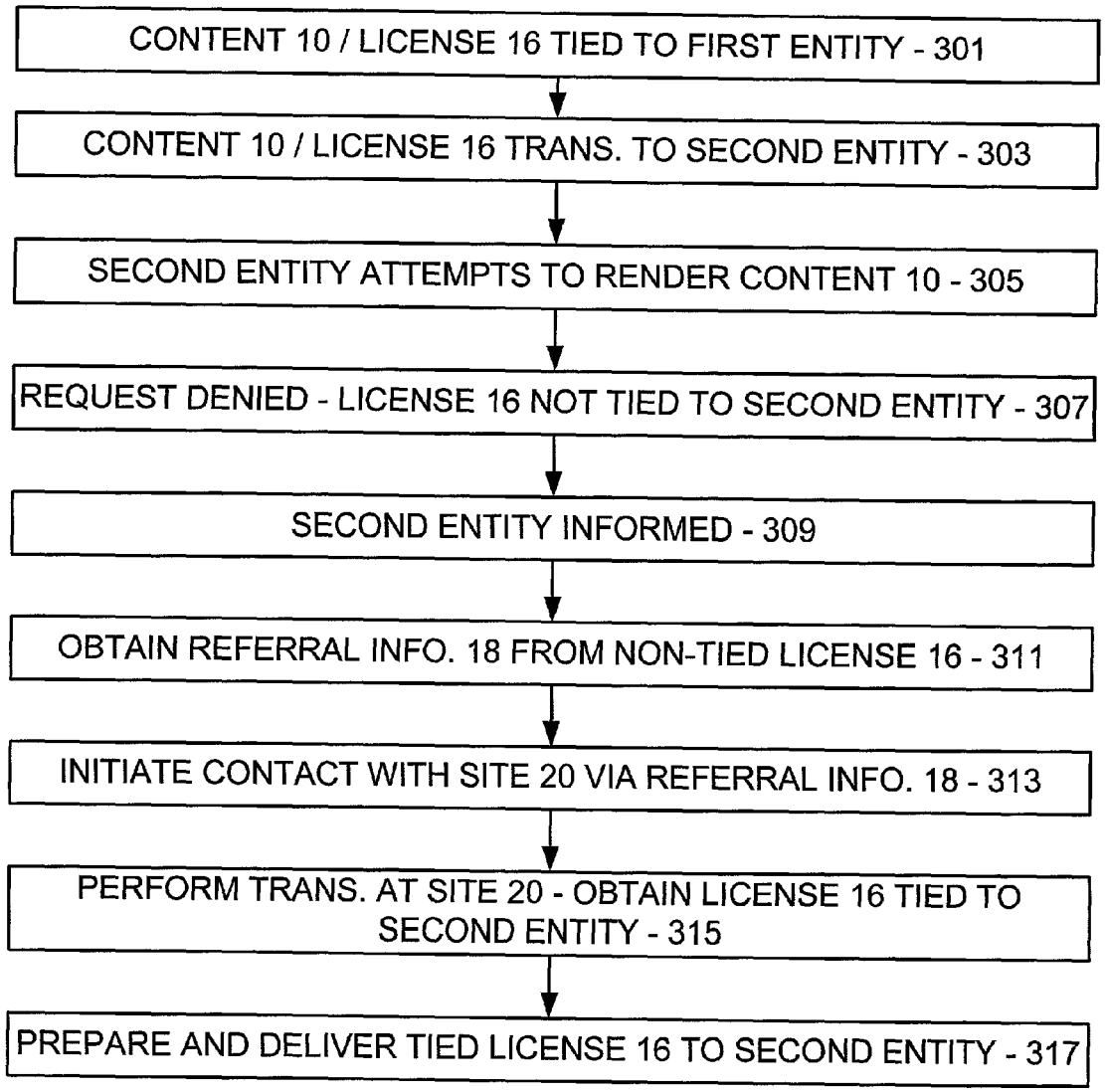
FIG. 3 is a flow diagram showing steps performed in accordance with one embodiment of the present invention where a license tied to a second persona is obtained based on referral information in a license tied to a first persona.

Turning now to FIG. 3, it is seen that in the case where the content 10 and license 16 are tied to a first user/computing device 14 (hereinafter 'persona') (step 301), such content 10 and license 16 are then transferred to a second persona (step 303), and the second persona attempts to render the content 10 (step 305), the request will be denied for the reason that the license 16 is not tied to the second persona (step 307). In particular, in such situation, the first persona has key pair (PU-1, PR-1), the second persona has key pair (PU-2, PR-2), the license 16 includes (PU-1(CK)), and the second persona does not have the required (PR-1) that would decrypt (PU-1(CK)). The situation is similar if the content 10 and license 16 are tied to a first user or a first computing device 14 and transferred to a second user or a second computing device 14.

In the prior art, and as was set forth above, the second persona would be informed of the failure to render (step 309), nothing more could be done, and the render request process would thus terminate. In one embodiment of the present invention, however, and as seen in FIG. 3, the process does not terminate but instead proceeds to refer the second persona to a site such as a web site where the second persona can obtain a license 16 tied to such second persona and thus capable of allowing rendering of the content 10 to proceed.

In particular, and referring back to FIG. 2, it is seen that in addition to (PU-2(CK)), the non-tied license 16 includes referral information 18. In one embodiment of the present invention, such referral information 18 includes an address of a site 20 at which the tied license 16 may be obtained. Notably, such site 20 may be accessible by way of a network 22 such as the Internet or the like, and accordingly the second persona may be required to have an appropriate network connection. The site 20 may be any appropriate site without departing from the spirit and scope of the present invention. For example, if the non-tied license 16 was originally obtained by the first persona from a particular retailer, the site 20 may be run by or on behalf of such retailer, and may even be the site 20 that originally provided the license 16 to the first persona. In addition to or as an alternative to the address of a site 20, the referral information 18 could include other contact information such as a geophysical address, a telephone number, a facsimile telephone number, an email address, a clear-text message, etc.

Figure 2:
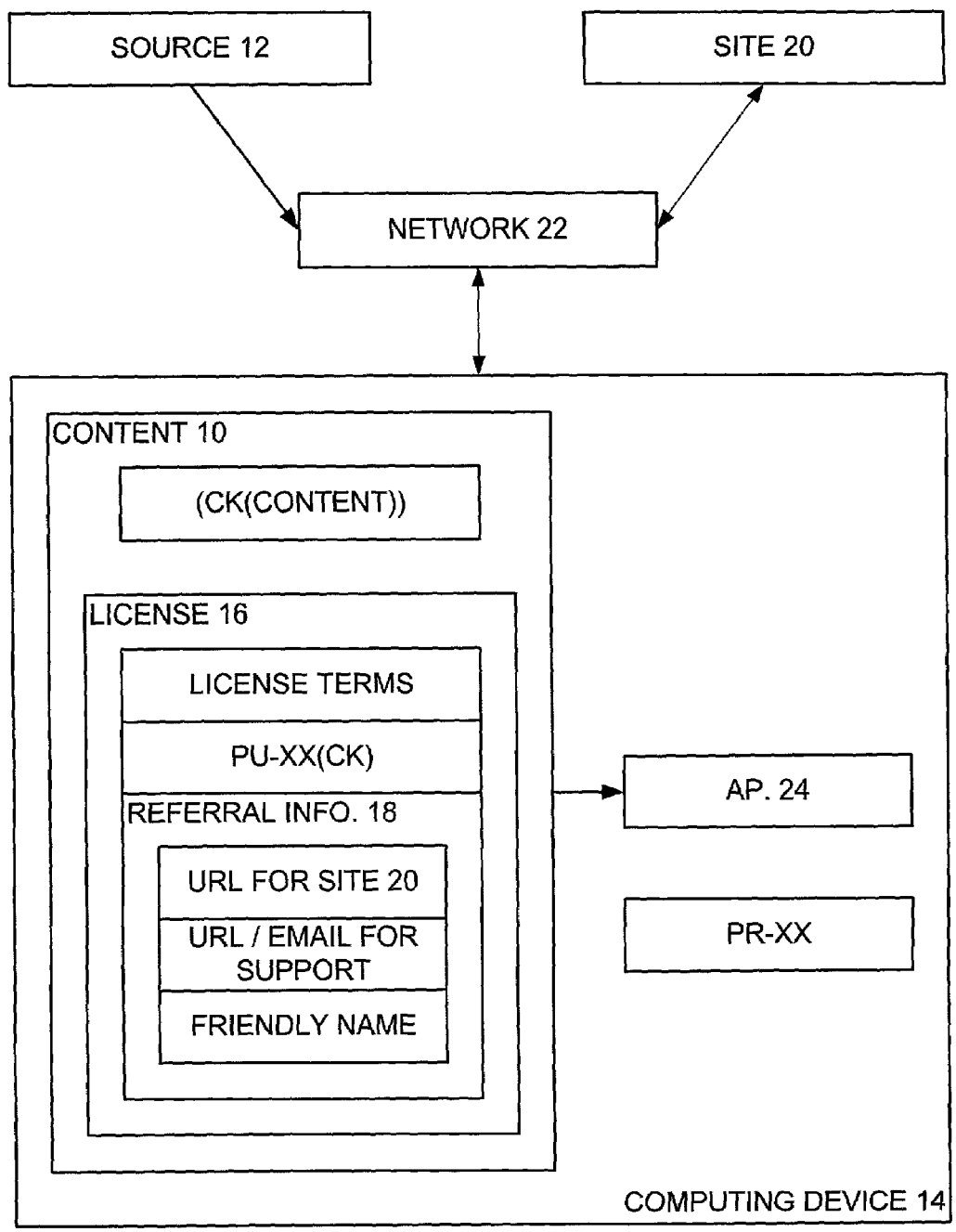
FIG. 2 is a block diagram showing content and a license therefor in accordance with one embodiment of the present invention.

In one embodiment of the present invention, and as seen in FIG. 2, the referral information 18 in the non-tied license 16 has a first URL which identifies the web site 20 from which the tied license 16 for the content 10 may be obtained, where such first URL includes any specific metadata desired, such as a bounty or incentive program ID, an ID of the user that originally obtained such non-tied license 16, other data, etc. The referral information 18 may also have a second URL which identifies a web site 20 from which support may be obtained if the first URL is defective (e.g., is stale). The second URL may instead be an email address, if desired. The referral information 18 may further have a friendly name that is displayed to the user as representative of the first URL, especially since the first URL can easily be too long and contain too much raw data to be displayable in an elegant manner.

As may be appreciated, the attempt to render is handled by an appropriate application 24 on the computing device 14, and the application 24 after informing of the failure to render (step 309) obtains the referral information 18 from the non-tied license 16 (step 311) and employs same as appropriate. In particular, if in fact the referral information 18 includes the address of a site 20, the application 24 employs same to initiate contact with site 20 over the network 22 or the like (step 313).

Of course, the application 24 may precede such step 313 by presenting a message to a user and asking the user for permission to initiate such contact. In particular, it may be the case that the application 24 renders the referral information 18 to the user in such a way that the user can act upon same. In the case where the referral information 18 is a URL, the user can follow the link. For an address or phone number, the user can contact the site thereby. For a clear text message, the user can read same and follow the instructions.

Especially in the case of the Internet, the address of the site 20 is a URL, and may include detailed information including an identification of the content 10, among other things. Thus, such URL conveys the user directly to a page at which a tied license 16 for the content 10 may be obtained. Of course, obtaining the tied license 16 may involve some sort of exchange of value such as a payment, which the site 20 likely controls. At any rate, the user performs a transaction at the site 20 to obtain the license 16 (step 315), and such tied license 16 is then prepared and delivered to the second persona (step 317), perhaps by way of the network 22.

As may be appreciated, in the course of preparing and delivering the tied license 16 to the user, such user must transmit sufficient information to in fact tie the tied license 16 to the persona. In the case where tying to the persona is accomplished by encrypting (CK) within the license 16 by a public key (PU-XX) of the persona, such sufficient information includes such (PU-XX), perhaps in the form of a certificate or the like.

As may also be appreciated, preparing and delivering the tied license 16 to the persona can involve multiple servers operating in cooperation with each other in a fairly involved manner. For example, it may be the case that the site 20 is operated by the retailer to collect information from the user and process a payment, and the retailer communicates at least a portion of the collected information to a license server akin to source 12 that actually prepares the tied license 16 based on the communicated information and delivers same. Alternately, the license server is replaced by a content and license server akin to source 12 that prepares the tied license 16 based on the communicated information, inserts the prepared license 16 in corresponding content 10, and delivers the content 10 with the license 16.

Methods of preparing and delivering a tied license 16 to a requestor are set forth in the aforementioned documents that have been incorporated by reference, although other methods may also be employed without departing from the spirit and scope of the present invention. Significantly, in preparing the tied license 16, the site 20 likely will insert or have inserted referral information 18 into such tied license. Thus, if another (third) persona receives the newly tied license 16 at some later time, such third persona can be referred to obtain a tied license 16 in the manner set for the herein.

Note that in the case where the tied license 16 and content 10 are packaged together, delivery of the tied license 16 to the persona necessarily also requires delivery of the content 10, even though the persona already has the content 10. In most cases, it is believed that the size of the content 10 and the bandwidth of the delivery medium are sufficient so that re-delivery of the same content 10 along with the tied license 16 is not overly burdensome.

As may be appreciated, the referral information 18 in a license 18 should not be modifiable by any external party. Accordingly, the referral information should be the basis, perhaps along with other items, for a signature that is verified prior to employing such referral information 18. Otherwise, a nefarious party would be able to alter such referral information 18 to re-direct referrals away from the retailer. More ominously, such altered referral information 18 could be employed to insert a virus or the like into the computing device 14 either directly by way of executable code or indirectly by referring to a site 20 where the executable code is supplied.

With the present invention as set forth above, a typical scenario may play along the lines of the following:

User A runs a web site with various information on an author, including a downloadable eBook (electronic book) written thereby. The eBook includes content 10 and a license 16 with pre-determined referral information 18, all in a single file. User A purchased the eBook from a retailer and the license 16 in the eBook is therefore tied to User A. User B visits the site of User A and in the course of doing so downloads the eBook. Of course, upon attempting to render same, User B is presented with a message that the rendering attempt failed User B does not have appropriate rights (i.e., because the eBook is not tied to User B). In addition, and based on referral information 18 in the license 16 of the eBook, User B is invited to obtain a tied license 16 at an appropriate sight, in this case by a provided link that may be selected by User B.

User B in fact selects the provided link and is taken to a page of the aforementioned retailer devoted to the specific eBook. In addition, since User A is registered with a 'bounty' or incentive program of the retailer, the retailer credits User A with a page view credit and a bounty purchase credit if User B in fact obtains the tied license 16. Significantly, since the retailer can specify the referral information 18, including any specific URL, such retailer can include within such URL an ID that identifies User A for purposes of the bounty program. If User B obtains the tied license 16, the retailer can also decide whether such tied license 16 also includes as referral information 18 the ID for User A, the ID for User B, or both, with regard to the bounty program or any other program.

Conclusion

Employing the referral information 18 within the license 16 provides substantial benefits to both a retailer and a user. The retailer receives the benefit of additional purchases based on an originally purchased license 16, and the user of a non-tied license 16 is conveniently directed to a site 20 where a corresponding tied license 16 may be obtained, and thereby enjoys a satisfactory user experience as compared with a mere process termination. Moreover, the user is educated about digital rights and is provided with an opportunity to obtain a tied license 16 that provides the rendering rights sought.

In addition, the use of referral information 18 within the license 16 provides the retailer with the opportunity to implement a reward program such as one that rewards users who facilitate referrals. Further, and bearing in mind that at least a portion of any license fee received from a user by a retailer is forwarded from the retailer to a rights owner or the like, a retailer that places referral information 18 within a license 16 may expect to keep a greater portion of the received license fee on the basis that the retailer is generating additional fees for the rights owner based on such referral information 18.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that provides referral information 18 in a digital license 16, and that employs such referral information 18 after a failed attempt to render at a transferred-to location or other failed attempts to render, where the referral information 18 refers a user to a site 20 where the user can obtain an appropriate license 16. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method, the method being performed with regard to a first digital license corresponding to a piece of encrypted digital content, the encrypted digital content provided via a retailer, the first license including a content key for decrypting the encrypted content, the content key being encrypted, the first license being tied to a first persona by way of the encrypted content key of the first license being decryptable by a first decryption key available only to the first persona; the first license further including referral information specifying a location of a licensor, the method being performed as a computer process on a computing device and comprising:

receiving a request from a second persona to render the content by way of the first license;

determining that the second persona does not have the first decryption key available only to the first persona and therefore that the first license is not tied to the second persona;

denying the request from the second persona based on the first license not being tied to the second persona;

obtaining the referral information from the first license, the first license comprising a Universal Resource Locator (URLL) of a site at which the second license may be obtained from the licensor and a friendly name representative of the URL and an identifier (ID) of the first persona;

obtaining the location of the licensor specified in the obtained referral information;

initiating contact with the licensor at the obtained location;

performing a transaction with the contacted licensor at the obtained location to obtain a second license tied to the second persona;

receiving the second license from the licensor including the content key for decrypting the encrypted content, the content key in the second license being encrypted, the second license being tied to the second persona by way of the encrypted content key of the second license being decryptable by a second decryption key available only to the second persona;

as a result of the transaction obtaining the second license, receiving from the retailer a bounty credit provided to the first persona, the first persona identified using the ID of the first persona in the referral information from the first license;

determining that the second persona has the second decryption key available only to the second persona and therefore that the second license is tied to the second persona;

granting the request from the second persona based on the second license being tied to the second persona.

2. The method of claim 1 wherein the first persona has a public/private key pair (PU-1, PR-1), the second persona has a public private key pair (PU-2, PR-2), the first license includes the content key encrypted according to (PU-1), and the second persona has (PR-2) but not (PR-1), (PR-1) being necessary to decrypt the encrypted content key of the first license, (PR-2) being necessary to decrypt the encrypted content key of the first license,.

3. The method of claim 1 wherein the site is a network site and the address is a network address, the method comprising employing the obtained referral information to initiate contact with the network site by way of a network connection.

4. The method of claim 3 wherein the site is an Internet site and the address is a URL, the method comprising employing the obtained referral information to initiate contact with the Internet site.

5. The method of claim 1 wherein performing the transaction comprises transmitting information to the licensor at the location to be employed by the licensor to tie the second license to the second persona.

6. The method of claim 5 wherein tying the second license to the second persona is accomplished by the licensor by encrypting the content key for the content within the second license by a public key of the second persona, and wherein transmitting information comprises transmitting such public key of the second persona to the licensor at the location.

7. The method of claim 1 wherein receiving the second license comprises receiving the second license including referral information specifying a location at which a third persona may obtain a third license for the content tied thereto.

8. The method of claim 1 wherein receiving the second license comprises receiving the content including the second license integral therewith.

\* \* \* \* \*